Jan. 16, 1962  A. E. HOYLER  3,016,766
PIVOT BEARING, PARTICULARLY FOR WINDSHIELD WIPERS
Filed Nov. 20, 1957
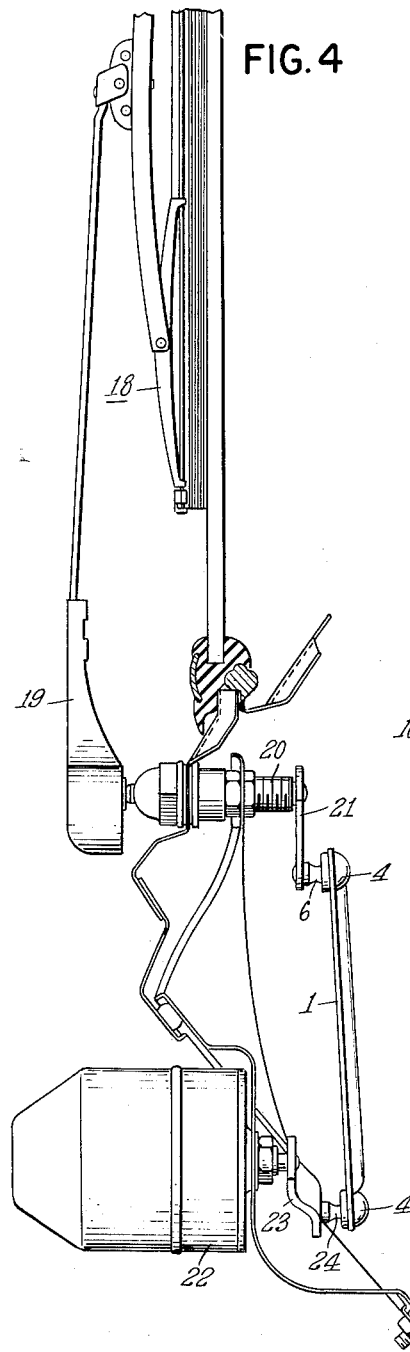
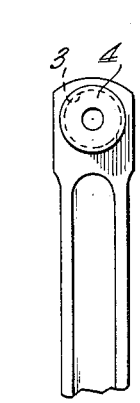
FIG. 1
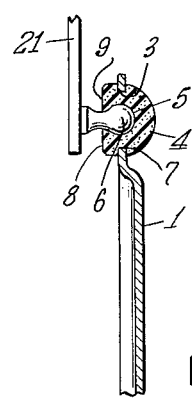
FIG. 2
FIG. 4
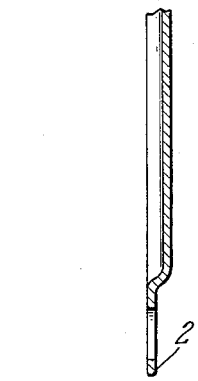
FIG. 3

United States Patent Office 3,016,766
Patented Jan. 16, 1962

3,016,766
PIVOT BEARING, PARTICULARLY FOR WINDSHIELD WIPERS
Alfred Ernst Hoyler, Buhlertal, Baden, Germany, assignor to Avog Elektro- und Feinmechanik G.m.b.H., Buhlertal, Baden, Germany, a corporation of Germany
Filed Nov. 20, 1957, Ser. No. 697,597
Claims priority, application Germany Nov. 24, 1956
1 Claim. (Cl. 74—588)

My invention relates to bearings of the type having a bushing of elastic material fastened to a rigid component and engaged by a rigid pivot member to be linked with that component. In a more particular aspect, my invention relates to pivot bearings in windshield wiper drives for vehicles.

It is an object of my invention to simplify the assembling of such bearings and to secure a more reliable fastening of the bearing components to one another once the bearing is assembled.

Another object of my invention, relating to windshield wiper drives, is to simplify the assembling of the drive components and to also eliminate the need for lubrication or other maintenance as well as the occurrence of noise in the bearing during operation of the wiper drive.

To achieve these objects, and in accordance with a feature of my invention, the rigid bearing component to be pivotally joined with a rigid pivot pin has a flat portion traversed by a bore, or by coaxial bores, for the reception of the elastic bushing; and the bushing, which receives the pivot pin, has an annular constriction on one or both ends seated in the above-mentioned bore or bores.

When assembling such a bearing, the elastic bushing, after being deformed, for instance by hand, can readily be inserted into the bore. By virtue of the inherent elasticity of the bushing material, the bushing then resumes its original shape when its constricted portion is seated in the bore, thus being secured from inadvertent removal. Once the pivot pin is inserted into the opening of the bushing, any inadvertent loosening of the bushing is virtually made impossible. Since neither rivets nor screws are needed for fastening the bearing components, the assembling of bearings according to the invention is considerably facilitated.

According to still another feature of my invention, I join the rotating crank of a windshield wiper drive with the oscillating windshield wiper arm to be driven, by means of an elongated connecting rod which carries on one or both of its ends a pivot bearing with an elastic bushing whose constricted portion is seated, in the manner described above, in a bore traversing the linking rod.

An embodiment of the invention is illustrated by way of example on the accompanying drawing, in which:

FIG. 1 shows a modified connecting rod as used for transmitting the continuous rotating motion of a drive motor onto an oscillating arm of a windshield wiper.

FIG. 2 shows a sectional side view of the same windshield-wiper connecting rod as well as part of the wiper arm driven thereby.

FIG. 3 is a sectional view of the preferred form of a pivot bearing; and

FIG. 4 shows partly in section a complete windshield wiper drive.

The modified connecting rod 1 according to FIGS. 1 and 2 has two flat end portions provided with respective bores 2 and 3 for receiving a bushing. Inserted into bore 3 is a bushing 4 of elastic material such as synthetic rubber or other radially expandable elastomer substance having bearing qualities. The bushing 4 is provided with a cavity 5 of generally spherical shape. Seated in the cavity is the spherical head portion of a pivot pin 6. The portion of the bushing beneath the bottom of the cavity 5 forms a conical or spherical taper. A constriction formed by an annular groove 7 is provided on the outer cylindrical surface of the bushing. This constriction firmly straddles the end of the connecting rod 1 when the bushing, as shown, is seated in the bore. The pivot pin 6 is firmly mounted on a wiper arm 20 to be driven by the connecting rod.

When assembling the pivot bearing, the tapering end of the bushing 4 is manually forced against and into the bore of the rigid connecting rod 1 so that the bushing 4 becomes deformed and yields into the illustrated position. Immediately thereafter, the deformation vanishes by virtue of the elasticity inherent in the bushing material so that the bushing again resumes the original, illustrated shape. Then the spherical head of the pivot pin 6 can be forced into the bore 5. When this is being done, the zones denoted by 8 and 9 will elastically bulge outwardly until the spherical head is fully inserted, whereafter the portions 8 and 9 again return to the illustrated position and then lock and secure the bushing as well as the pivot pin in position. For preventing the elastic bushing from rotating relative to the connecting rod 1, the bores 2 and 3 may be non-circular and hence may have straight edges 10 and 11 which enter into mating grooves of the annular constriction in the bushing.

In the preferred embodiment shown in FIG. 3, the rigid bearing structure 12 consists of a strip of flat material and has the illustrated end bent to a U-shaped configuration. The two limbs of the U-shape are provided with respective coaxial bores 13 and 14. Seated between the two limbs is a pivot bushing 15 of elastic material which has constricted portions 16 and 17 at both ends seated in the respective bores 13 and 14 so as to form annular shoulders that firmly secure the bushing in position. When assembling the bearing structure, the elastic bushing 15 is first axially compressed and then shoved between the two limbs of the U-shape. Once the constricted ends catch into the respective bores, the bushing snaps back into its original, illustrated shape and is thereafter secured from inadvertent removal.

While the invention is applicable elsewhere, it is particularly advantageous in conjunction with windshield wiper drives where, aside from the simplified assembling operation, it affords the further advantage that the bearings of the wiper drive do not require any maintenance and cannot produce noise during operation. The embodiment of such a drive shown in FIG. 4 is provided with modified connecting rod bearings of the kind described above with reference to FIGS. 1 and 2. The windshield wiper assembly 18 is mounted on a holder 19, the shaft 20 of holder 19 carries the above-mentioned arm 21. The arm is driven from a motor 22 whose shaft carries a crank 23 with a crank pin 24. The connecting rod 1, linking the crank pin 24 to the pivot pin 6 of wiper arm 21, is provided with two bearing bushings 4 as described in the foregoing.

It will be obvious that if the same motor is to drive two windshield wipers, the crank member may be provided with two crank pins for driving two connecting rods that are both equipped with bearings according to the invention and lead to the respective two windshield wipers, or the wiper arm 21 may be provided with a second pivot pin which, by means of another connecting rod with bearings according to the invention, is linked with the oscillating drive arm of the other windshield wiper. Such and other modifications, as well as uses of the invention other than those particularly described herein, will offer themselves to those skilled in the art without departing from the essential features of my invention and within the scope of the claim annexed hereto.

I claim:

A pivot bearing for the driving linkage of a windshield wiper, comprising a rigid bearing structure having a flat portion of bent and U-shaped configuration, said structure having two aligned coaxial bores through the respective flat limbs of the U-shaped portion, at least one of said bores being non-circular, a bushing of elastic material having a radially expandable middle portion between said two limbs and having two ends of smaller diameter than said middle portion and seated in said respective bores, said bushing having a central opening extending through said middle portion and said end portions in coaxial relation to said bores, said opening having an internal bearing surface of said elastic material, whereby said bushing is non-rotatably locked in between said bores by the radial elasticity of said material when said opening is occupied by a removably insertable pivot pin.

References Cited in the file of this patent

UNITED STATES PATENTS

| | | |
|---|---|---|
| 1,902,667 | Sanders | Mar. 21, 1933 |
| 1,964,432 | Geyer | June 26, 1934 |
| 2,232,480 | Schmid | Feb. 18, 1941 |
| 2,243,286 | Probst | May 27, 1941 |
| 2,424,914 | Brown | July 29, 1947 |
| 2,691,186 | Oishei | Oct. 12, 1954 |
| 2,745,130 | Oishei | May 15, 1956 |

FOREIGN PATENTS

| | | |
|---|---|---|
| 543,013 | Great Britain | Feb. 5, 1942 |
| 820,701 | Germany | Nov. 12, 1951 |
| 845,561 | France | May 15, 1939 |